Patented Aug. 26, 1952

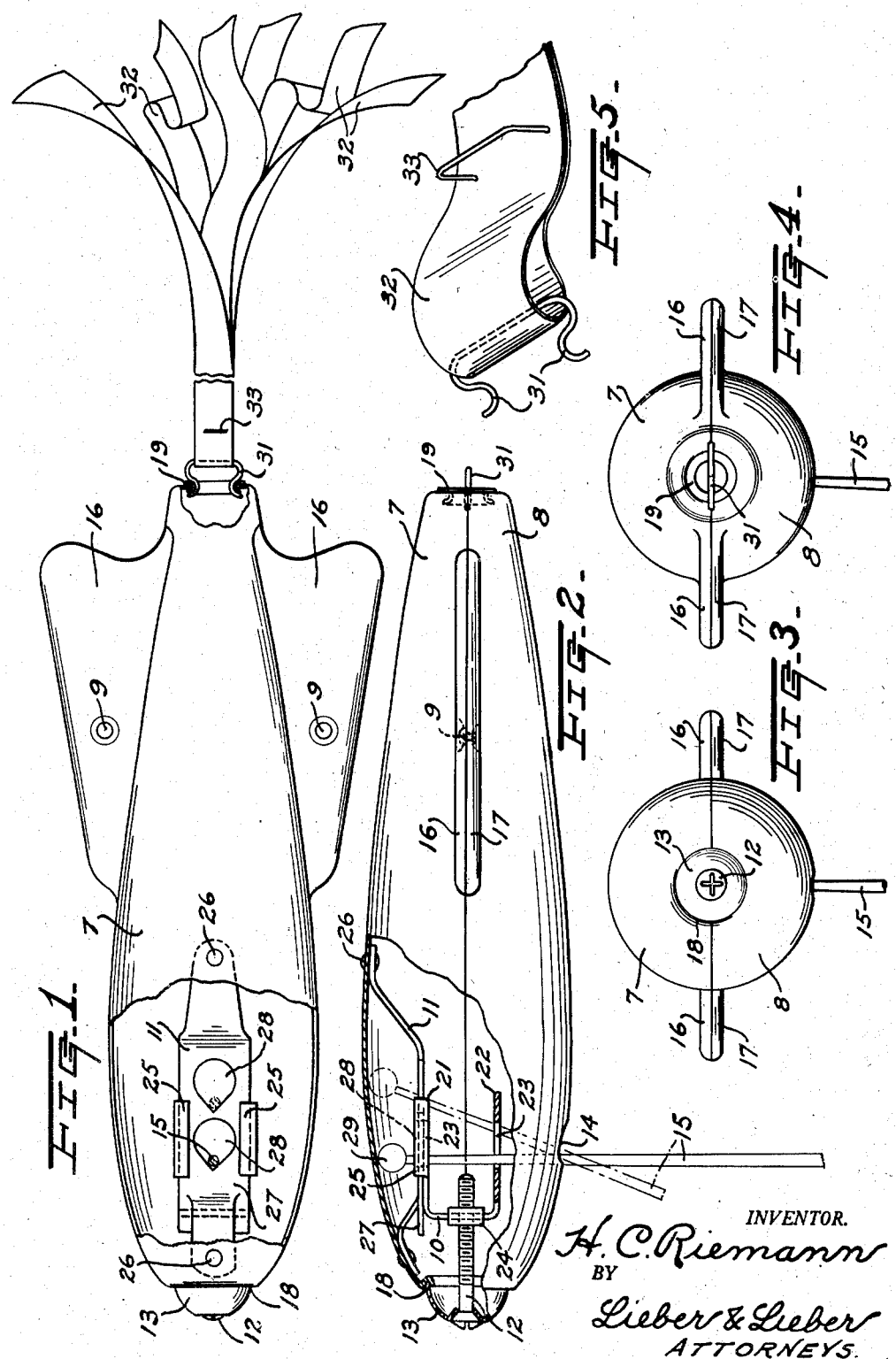

2,608,655

UNITED STATES PATENT OFFICE 2,608,655

VEHICLE AERIAL BOOSTER

Howard C. Riemann, West Allis, Wis., assignor to The Fulton Company, West Allis, Wis., a corporation of Wisconsin Application November 4, 1949, Serial No. 125,580

4 Claims. (Cl. 250—33)

My invention relates generally to improvements in radio appliances, and relates more particularly to improvements in the construction and operation of devices for boosting or increasing the effectiveness of rod-like aerials such as are customarily applied to the radios of vehicles or other movable objects.

Various types of socalled aerial boosters for intensifying the effectiveness of automobile radio rod aerials, have heretofore been proposed; and as shown and described in my copending application Serial No. 108,641, filed August 4, 1949, I have heretofore developed a hollow metallic aerial appliance of this general type wherein a torpedo shaped body is adapted to be pierced by a rod aerial and is pivotally attachable to the aerial rod at any desired locality by means of a stiff tension spring confined within the hollow body. While this prior device is entirely satisfactory so far as performance is concerned, it is rather difficult to apply; and the provision of openings in the top of the body through which the aerial rod extends is objectionable because it permits sleet and snow to enter and lodge within the body. Then too, a rather strong and heavy spring is required in order to hold the body in different positions of adjustment, and in most cases it is desirable to position the booster at the extreme upper end of the aerial so that no adjustment or puncturing of the top of the appliance is necessary.

It is therefore a primary object of my present invention to provide various improvements in vehicle aerial intensifiers whereby the above mentioned objectionable features of prior aerial boosters are eliminated, and which enable the production of simpler and more efficient aerial appliances of the type mentioned.

Another important object of this invention is to provide an improved rod aerial booster especially adapted for convenient application to automobile aerial rods having varying inclination, and which will float through the air with minimum resistance.

A further object of the present invention is to provide an improved automobile aerial accessory for augmenting the radio reception, which may be readily formed of thin and light sheet metal and applied to the upper extremity of the aerial rod so as to permit free pivotal movement of the booster body about the axis of its supporting rod.

Still another object of the present invention is to provide an improved intensifier for rod aerials, in which the body of the device is devoid of openings at the top or front, and which is highly attractive as an accessory.

An additional object of my invention is to provide a radio aerial booster which may be manufactured and sold at moderate cost either provided with attractive streamers or without the latter, and which avoids the use of springs in its attachment to the aerial rods.

These as well as other objects and advantages of the present improvement, will be apparent from the following description.

A clear concept of the several improved features, and of the construction and operation of an automobile radio aerial booster embodying the same, may be had by referring to the drawing accompanying and forming a part of this specification in which like reference characters designate the same or similar parts in the various views.

Fig. 1 is a top view of a typical aerial intensifier embodying the invention; with streamers applied and with a portion of the top section of the body broken away to reveal internal structure;

Fig. 2 is a part sectional side elevation of the same booster unit with the streamers omitted, and with the aerial rod clamping structure shown in inactive position;

Fig. 3 is a front view of the typical aerial booster shown in Figs. 1 and 2;

Fig. 4 is a rear view of the same appliance; with the streamers omitted; and

Fig. 5 is an enlarged perspective view showing the manner in which the streamers may be applied.

Although the invention has been illustrated herein as being advantageously applicable to automobile aerial intensifier units or boosters, the improved features may be susceptible of more general application; and it is contemplated that specific descriptive terms used herein be given the broadest possible interpretation consistent with the disclosure.

With reference to the drawing, the improved vehicle aerial booster shown therein comprises in general a light hollow torpedo shaped body formed of two sheet-metal sections 7, 8 firmly united by rivets 9 or otherwise, and having therein a rod clamping mechanism consisting of a movable member or frame 10 adjustably cooperable with a bracket 11 and being movable by means of a jack screw 12 coacting with a nose cap 13.

The upper and lower casing or body sections 7, 8 are substantially alike except that the top section 7 is imperforate while the bottom section 8 has a central hole 14 therein for the reception of the free end of an aerial rod 15, and both of these sections 7, 8 may therefore be produced from thin sheet aluminum or other sheet metal with the aid of the same punches and dies. Each of the body sections 7, 8 is provided with a pair of integral rear guiding fins 16, 17 with which the rivets 9 coact to permanently unite the sections; and the front of the assembled body is provided with an annular recess 18 within which the brim of the cup-shaped nose cap 13 is normally seated, while the rear of the body assemblage has an opening within which an annular sheet metal tail grommet 19 may be rigidly confined, see Figs. 1, 2, and 4.

All of the parts of the aerial rod clamping mechanism or assemblage except the jack screw 12 may also be formed of relatively light but sturdy sheet metal with the aid of punches and dies. The movable clamping frame 10 is U-shaped having parallel upper and lower legs 21, 22 respectively each of which is provided with a single opening 23 both of which are vertically alined, and the front wall of the frame 10 has a threaded hole therein with which the jack screw 12 coacts. A sheet metal bifurcated nut 24 may also be provided at the upright front wall of the clamping frame 10 as shown in Fig. 2 in order to reenforce the screw threads in the frame, and the upper leg 21 of the frame 10 is provided with integral parallel guide flanges 25, as illustrated in Figs. 1 and 2.

The fixed bracket 11 is rigidly attached to the top section 7 of the body by means of rivets 26 or otherwise, and has an elongated flat plate 27 the opposite side edges of which are slidably engaged by the flanges 25 of the clamping frame 11, and the medial portion of which is provided with two or more openings 28 as clearly shown in Fig. 1. The upper end of the aerial rod 15 is usually provided with a small ball tip 29, and all of the openings 14, 23, 28 should be of sufficient size to permit insertion and withdrawal of the tip 29 therethrough when these openings are alined with each other and before clamping of the rod 15 has been effected. These openings are also preferably shaped as in Fig. 1 in order to insure most effective final clamping of the aerial.

The cup shaped nose cap 13 has its brim normally seated in the annular body recess 18 as illustrated in Fig. 2, and the head of the jack screw 12 coacts with a tapered central socket formed in the sheet-metal cap 13 while its threaded shank coacts with the movable frame 10 and with the nut 24. The annular tail grommet 19 is formed to receive a wire spring clip 31 having hook ends adapted to be projected within the central grommet opening and to engage the grommet 19 as in Fig. 1, and one or more tail ribbons or streamers 32 may be secured to this clip 31 with the aid of a staple 33 or otherwise. These streamers 32 may be formed of plastic and of various colors, but may be replaced by any other type of streamer.

When the various parts of the improved aerial booster unit have been properly constructed and assembled as above described, the appliance may be readily applied and attached either to a vertical aerial rod 15 as shown in solid lines, or to an inclined aerial as depicted in dot-and-dash lines in Fig. 2. When applying the booster, the openings 14, 23, 28 should first be positioned with the aid of the jack screw 12 and movable frame 10 so as to permit free insertion of the ball tip 29 therethrough until the top section 7 of the body rests upon the ball. The jack screw 12 may then be manipulated with the aid of a screw driver, to cause the frame 10 to slide along the bracket 11 until these elements firmly grip the aerial rod 15. The unit while being held in place may thereafter swing freely about the aerial axis, while the fins 16, 17 will be disposed horizontally. When the vehicle to which the booster unit has been thus applied is subsequently operated, the fins 16 will cause the body to advance in the direction of travel and the streamers 32 will trail the body of the intensifier as indicated in Fig. 1.

From the foregoing detailed description of the construction and operation of my present invention, it will be apparent that I have provided an improved rod aerial booster unit which besides being simple in construction and efficient in operation, is also highly attractive in appearance and easily applicable to or removable from the aerial rod. The streamlined torpedo shaped body of the device is devoid of top and front openings and floats through the ambient atmosphere with minimum resistance, and the upper and lower body sections 7, 8 may be produced at low cost with the aid of common dies. The improved clamping mechanism which is confined and concealed within the hollow body, provides simple but effective means for fastening the booster appliance to the aerial rod 15 while still permitting free swinging of the unit about the rod axis, and such attachment may be made to rods 15 disposed either vertically or inclined.

The streamers 32 may be readily attached or removed with the aid of the clip 32 and staple 33, and the grommet 19 serves to reenforce the metal of the body and also permits the streamers to revolve freely about the body axis. The cup-shaped nose cap 13 besides providing a bearing for the jack screw 12, also serves to prevent possible spreading of the body sections 7, 8 by virtue of the coaction of the cap brim with the recess 18, and the entire assemblage is strong and durable in spite of the use of relatively thin sheet-metal in its formation. The invention has proven highly successful in actual use and the improved boosters can be manufactured and sold at moderate cost for diverse uses.

It should be understood that it is not desired to limit this invention to the exact details of construction and operation of the aerial booster unit herein specifically shown and described, for various modifications within the scope of the appended claims may occur to persons skilled in the art.

I claim:

1. A rod aerial booster comprising, a hollow metal body having front and top closures and a lower opening for receiving a rod aerial having its tip engaging said top closure, a bracket fixedly secured within said body and having an opening engageable with the aerial rod within the body, a U-shaped frame having integral upper and lower legs the upper of which is slidably cooperable directly with said bracket while the lower leg is provided with an opening cooperable with the rod between said body and said bracket openings, and means coacting with said front closure for relatively moving said frame and bracket to clamp said body to the rod at said openings.

2. A rod aerial booster comprising, a hollow metal body having front and top closures and a lower opening for receiving a rod aerial having its tip engaging said top closure, a bracket fixedly secured within said body and having several openings selectively engageable with the front of the aerial rod within the body, a U- shaped frame having upper and lower integral rigid legs the upper of which is slidable along said bracket while the lower leg is provided with an opening cooperable with the rear of the rod between said body and said bracket openings, and means coacting with said front closure for relatively moving said frame and bracket laterally of said openings to clamp said body to the rod at both the lower body opening and at one of the said bracket openings.

3. A rod aerial booster comprising, a hollow metal body having front and top closures and a lower opening for receiving a rod aerial having its tip engaging said top closure, a bracket fixedly secured within said body and having an opening engageable with the front of the aerial rod beneath said tip but within the body, a U-shaped frame having upper and lower rigid legs the upper of which is slidably engageable with said bracket while the lower leg is provided with an opening cooperable with the rear of the rod between said body and said bracket openings but within the body, and a jack screw operable from the exterior of said body and journalled for rotation in said front closure and coacting with said frame to move said upper frame leg along said bracket and to thereby clamp the body to the rod at said openings.

4. A rod aerial booster comprising, an enclosed hollow metal body having a small bottom opening for receiving the upper free end portion of a rod aerial with its tip engaging the inner top surface of the body, a bracket fixedly secured within said body and having an opening engageable with the front of said rod portion within the body, a U-shaped rigid frame having upper and lower integral legs the upper of which has opposite side flanges slidably engageable with said bracket while the lower leg is provided with an opening cooperable with the rear of said rod portion within the body between said body and bracket openings, and a jack screw journalled for rotation in an end of said body and coacting with said frame between said legs to clamp the body to the rod at said openings.

HOWARD C. RIEMANN.

REFERENCES CITED

The following references are of record in the file of this patent:

UNITED STATES PATENTS

| Number | Name | Date |
|---|---|---|
| D. 101,128 | Lonsford | Sept. 8, 1936 |
| 2,132,938 | Dunn | Oct. 11, 1938 |
| 2,167,286 | Theobald | July 25, 1939 |
| 2,260,253 | Johnson | Oct. 21, 1941 |
| 2,274,884 | Brach | Mar. 3, 1942 |
| 2,321,272 | Becwar | June 8, 1943 |
| 2,478,273 | Jenkins | Aug. 9, 1949 |